Figure 1:
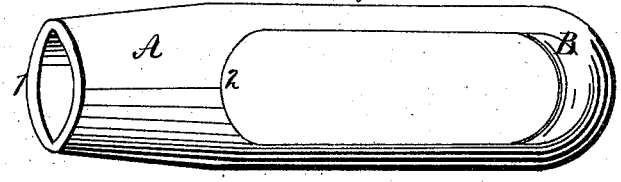

W. A. Jordan,

Harness,

N°. 81,788.  Patented Sep. 1, 1868

Witnesses,
Rufus R. Rhodes
H. N. Jenkins

Inventor,
Wm. A. Jordan

UNITED STATES PATENT OFFICE.

WILLIAM A. JORDAN, OF NEW ORLEANS, LOUISIANA.

IMPROVEMENT IN HARNESS.

Specification forming part of Letters Patent No. 81,788, dated September 1, 1868.

*To all whom it may concern:*

Be it known that I, WILLIAM A. JORDAN, of the city of New Orleans, parish of Orleans, and State of Louisiana, have invented a certain new, useful, and improved device for fastening the ends of certain parts of harness to certain other parts of the same, and to certain parts of the carriage or other vehicle to which, in the use of harness, it is necessary to effect a fastening; and I do hereby declare the following to be a full, clear, and exact description of the same, reference being had to the annexed drawing, making a part of this specification.

Before entering upon a description of my invention, it is proper to refer in brief terms to the well-known fact that, as to many parts of harness, metallic terminations or tips are employed as a means for establishing a speedy and secure connection or fastening thereof with other parts of the harness, and with the whiffletree and other parts of the vehicle with which such connection is necessary. The device has long been known and used, and greatly to the advantage of the public; but never yet has it assumed the form that is requisite to make it fulfill all the conditions of economy and usefulness of which it is susceptible. The reason of this has been because the said tips have been so constructed as to require to be permanently secured by rivets, nails, or screws to those parts of the harness to which they were attached, for, being so secured, they could not be applied, on the breaking or wearing out of such parts, to any further use without great trouble, and, oftentimes, a greater cost than that entailed in the purchase of a new one. Hence, when a part of a harness provided with metallic terminations breaks, the result usually is the total loss of the latter, because it is cheaper and less troublesome to replace the broken part with a new one to which such terminations have been attached at the manufactory than to take off such terminations from the broken part with the view to their application to a substitute therefor. Nor, when a rupture of a part provided with such terminations takes place, is it easy to apply a temporary substitute therefor, in consequence of the secure connection of such terminations to the other parts of the harness and their being in the way of the introduction or application of such temporary substitutes. Take, for example, a trace that is secured to its section of the harness by means of a metallic strap that, passing through an eye projection on the said section of the harness, is permanently fastened to the end of the trace by strong rivets. If the trace breaks, the whole harness is practically disabled until it can be taken to an appropriate workshop to be there repaired. The delay and inconvenience resulting from the method now practiced of attaching metallic terminations to certain parts of harness by permanently riveting them thereto whenever such parts give way has probably been experienced by nearly every person in the country who has had to deal with horses or mules in harness. Nor is this the only drawback that is necessarily incident to the existing mode of constructing and attaching to the harness the device to which I am referring. No general use of rope has ever obtained, notwithstanding that it is lighter and cheaper than, and quite as strong as, leather, in consequence of the impossibility of fastening the necessary metallic connecting terminations securely to it.

Now, my invention not only completely remedies the objectionable characteristics of the device as hitherto made, but it also secures a substitution of ordinary rope for leather, and even iron chains for the traces and several other parts of every harness, if such substitution be found desirable; and it consists of a metallic self-fastening device that is provided with an annular tapering socket-clamp and a loop-extension, the first to secure the connection with that part of the harness to the extremity or extremities of which it is attached, and the second to secure its connection with a hook upon the whiffletree, shafts, hames, or other part of the vehicle or harness with which a fastening is necessary.

Figure 2:
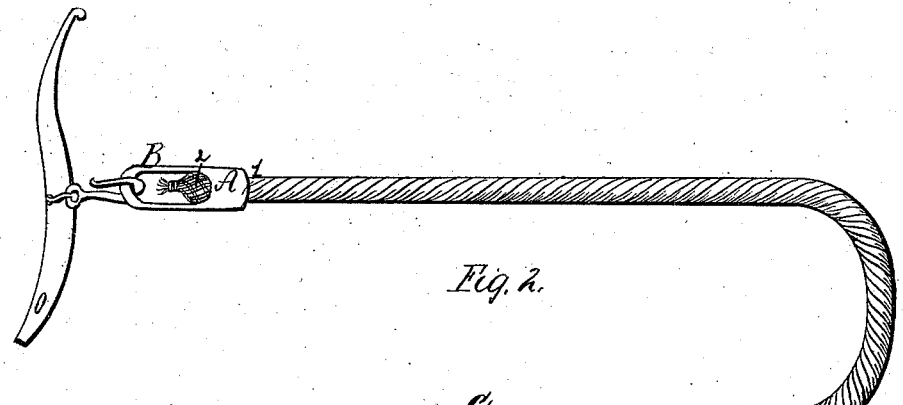

But my invention will be better understood by referring to the drawings, which at Figure 1 exhibit it detached from a harness, and at Fig. 2 in connection with a rope trace, one section of a hames, and one end of a whiffletree.

The annular socket-clamp A, it will be observed, tapers toward the point 1 in such manner that the diameter at that point is considerably less than at the end 2. The internal is precisely similar to the external conformation of the socket A, and hence the internal surface thereof presents an inclined plane that is circular, but converging in the direction of the end 1, and which will therefore act as a clamp upon any object that, entering at end 2, is yet too large to pass through end 1 of the socket if an attempt be made to draw such object through the same in the direction from 2 to 1, or tension be applied in that direction without such purpose. If, therefore, a rope trace, C, (see Fig. 2,) which is just large enough to pass readily through the end of this socket have a knot at its end, as shown, it is self-evident that said rope cannot be drawn through the socket, and that the latter, therefore, constitutes a far better method of fastening than any that has ever heretofore been devised. It is plain, also, that if the trace break, or for any other cause needs to be taken off the harness, it can be withdrawn from the sockets without the slightest difficulty by pulling it in a reverse direction. Extending out from the larger end of socket-clamp A is a loop, B, which constitutes a means for establishing a connection with a whiffletree and hames, or any other part of the vehicle or harness with which a fastening is to be made. A chain, D, may be used in connection with one or both ends of the trace or other part of a harness to which my device is attached, as shown at Fig. 2, as a means for shortening or lengthening such part in the usual manner.

The annular socket or socket-clamp A, as delineated on the drawings, is precisely circular; but it is obvious that if flat leather or flat rope be preferred, in the fabrication of those parts of the harness with which it is used, to round rope, as shown at Fig. 2, this socket-clamp may be modified into an oblate, elliptical, or any other form that is necessary to make it suit the part to which it is to be attached, without in the slightest degree interfering with the principle of its operation.

Having thus described my invention, what I claim as a new article of manufacture, and desire to secure by Letters Patent, is—

A metallic connecting termination or tip for certain parts of harness, as herein indicated, when the same consists of the self-fastening annular tapering socket-clamp A and a projecting loop, B, and is otherwise constructed substantially as herein described, for the purpose set forth.

WM. A. JORDAN.

Witnesses:
RUFUS R. RHODES,
H. N. JENKINS.